US007207607B2

(12) United States Patent
Brugner et al.

(10) Patent No.: US 7,207,607 B2
(45) Date of Patent: Apr. 24, 2007

(54) COAXIAL TWO-COMPONENT CARTRIDGE

(75) Inventors: Nikolaus Brugner, Ziemetshausen (DE); Alfons Gleich, Gennach (DE)

(73) Assignee: Sulzer Chemtech AG, Winterthur (CH)

( * ) Notice: Subject to any disclaimer, the term of this patent is extended or adjusted under 35 U.S.C. 154(b) by 0 days.

(21) Appl. No.: 10/932,916

(22) Filed: Sep. 1, 2004

(65) Prior Publication Data

US 2005/0093300 A1 May 5, 2005

(30) Foreign Application Priority Data

Oct. 31, 2003 (DE) .......................... 203 16 879 U

(51) Int. Cl.
*F16L 21/00* (2006.01)

(52) U.S. Cl. ...................... 285/401; 285/423; 285/328; 285/921; 285/391

(58) Field of Classification Search ................ 285/401, 285/391, 328, 921, 307
See application file for complete search history.

(56) References Cited

U.S. PATENT DOCUMENTS 750,565 A * 1/1904 Austin ........................ 220/682
1,469,009 A * 9/1923 Coleman ..................... 285/88
1,645,032 A * 10/1927 Wilson ........................ 285/27
2,066,956 A * 1/1937 Williams .................... 403/343
2,172,602 A * 9/1939 Williams .................... 403/343
2,218,092 A 10/1940 Nitardy
3,586,239 A * 6/1971 Blass ......................... 239/276
3,958,761 A * 5/1976 Watanabe ................... 239/542
4,771,919 A * 9/1988 Ernst .......................... 222/134
5,295,613 A 3/1994 Barthomeuf et al.
5,738,388 A * 4/1998 Sundelin ..................... 285/382
6,283,511 B1 * 9/2001 Kamp ........................ 285/391
6,634,524 B1 10/2003 Helmenstein

FOREIGN PATENT DOCUMENTS

DE 11 12 447 8/1961
DE 692 04 232 5/1996
DE 199 19 748 11/1999
DE 199 43 877 3/2001
FR 1202911 1/1960
FR 2676210 4/1992

* cited by examiner

*Primary Examiner*—Aaron Dunwoody
(74) *Attorney, Agent, or Firm*—Martin Fleit; Paul D. Bianco; Fleit Kain Gibbons Gutman Bongini & Bianco, P.L.

(57) ABSTRACT

The invention relates to a coaxial two-component cartridge, with an outer tube and a separate inner tube, both of which tape at one respective end into a respective neck, wherein the inner side of the neck of the outer tube and the outer side of the neck of the inner tube are each provided with locking elements that can be moved into engagement with each other, for a coaxial introduction of the inner tube into the outer tube, such that they fix the inner tube relative to the outer tube coaxially and in a predetermined axial position. The coaxial two-component cartridge distinguishes itself in that the locking elements of the neck of the outer tube are formed by a plurality in the axial direction of successive channels, and the locking elements of the neck of the inner tube are formed by a plurality in the axial direction of successive ribs integral with the neck, and the outer diameter of the neck of the inner tube including the ribs is at least as large as the clearance diameter of the channels.

20 Claims, 2 Drawing Sheets

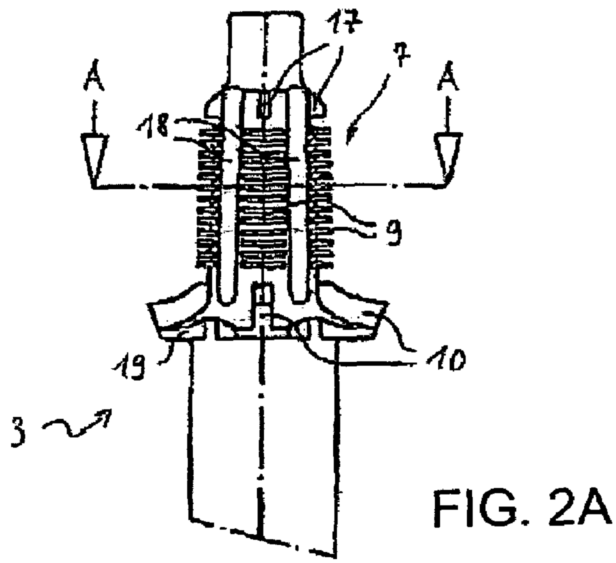
FIG. 2A
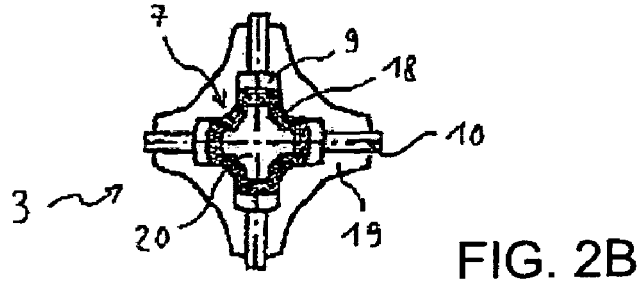
FIG. 2B
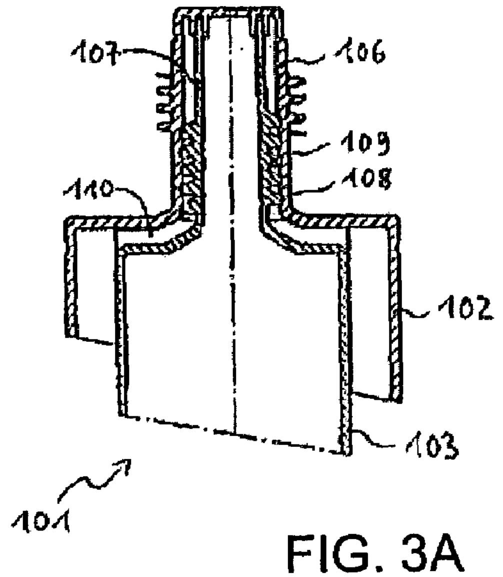
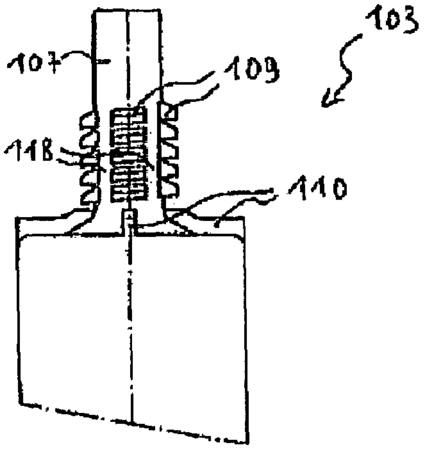
FIG. 3A FIG. 3B

COAXIAL TWO-COMPONENT CARTRIDGE

BACKGROUND OF THE INVENTION

1. Field of the Invention

The invention relates to a coaxial two-component cartridge.

2. Prior Art

Such coaxial two-component cartridges are advantageously manufactured so that the outer tube and the inner tube are manufactured separately. The two tubes must then be assembled together at a later time in order to obtain a coaxial cartridge. A suitable engagement must guarantee that the inner tube is rigidly anchored to the outer tube. The inner tube must not loosen when the cartridge is being transported or emptied. An inner tube that is not well-fastened, especially one that is no longer arranged in the center, can cause problems in an automatic emptying device because the emptying device might no longer be able to find the inner tube. Furthermore, when the cartridge is squeezed, the resulting internal pressure in the cartridge also acts on the floor of the inner tube, which can have the effect, if there is inadequate anchoring, of making the inner tube come loose, so that the cartridge can no longer be squeezed.

According to Utility Model DE 298 07 938 U1, two-part coaxial cartridges made from plastic are known. The engagement is released by a shoulder lying in one plane in the neck region of the outer tube and associated catch tabs on the inner tube. [Formation of] the shoulder in the outer tube is solved in terms of tool technology in that a separating plane is provided in the region of the shoulder. When opening the mold, here, the tool part engaging the tube above the separating plane is removed upward and the tool part engaging the tube below the separating plane is removed downward. With this method, it is possible to produce a shoulder with an arbitrary width, so that the locking tab can be engaged and held without a problem. However, because both sides must be removed from the mold, it is not possible with this design to produce a cartridge with a molded seal that is integrated with the outer tube. Instead, it requires an additional sealing cap, which means increased production and assembly costs.

In principle, the shoulder can also be demolded from the rear as an undercut, so that the cartridge can be produced in a closed configuration with a molded sealing cover. Because the undercut requires forcible ejection, the shoulder cannot be made with sharp edges and the width of the shoulder is limited to a few tenths of a millimeter. This leads to a greatly reduced, potentially inadequate, retaining force.

A two-part coaxial cartridge is known From DE 199 43 877 A1 in which the inner tube is produced from aluminum. Sawtooth-shaped ribs are formed on the inner tube. The aluminum ribs dig into the soft outer tube consisting of plastic during pressing and thus form a tight anchoring effect. The disadvantage of this solution is that the use of aluminum tubes is expensive, and a cartridge consisting of metal and plastic creates a problem ecologically with regard to disposal.

SUMMARY OF THE INVENTION

Taking into consideration this prior art, the task of the invention is to create a two-part coaxial cartridge that can be produced from economical plastic and is suitable for a closed outlet that is connected integrally to the cartridge and that is opened by ripping, cutting, or breaking. In addition, this coaxial cartridge preserves the anchoring of the inner tube and guarantees a central positioning of the same.

The task is solved according to the invention by the features disclosed hereinafter, and the advantageous refinements of the invention as described.

By means of the invention, the retaining force for fixing the inner tube relative to the outer tube is distributed through a Christmas tree-like channel structure on the outer side of the neck of the inner tube to a plurality of channel branches on the inner side of the neck of the outer tube, and thus uniformly over a significant portion of the length of both necks. This guarantees a fixed seat of the connection and, also, a stable coaxial position of both tubes relative to each other with only a minimal channel depth and a rounded channel shape.

In this way, the inner profile of the outer tube, which features a plurality of successive channels, is manufactured advantageously in an injection-molding process with final removal from the mold in a single direction, namely opposite the later installation direction of the inner tube. To realize a minimal channel depth, a forced removal is possible, and to realize the channels as threads, it is also possible to cut the threads.

The connection of the two tubes can be realized by axial pressing, wherein the ribs are bent back against the installation direction and remain permanently in this deformed state in order to exert an axial retaining force on the inner tube. For a realization of the channels and ribs as matching threads, the connection can also be produced by rotation, wherein the retaining force is produced from the thread connection.

BRIEF DESCRIPTION OF THE DRAWINGS

In the following, embodiments of the invention are described with reference to the drawings. Shown here are.

DETAILED DESCRIPTION OF PREFERRED EMBODIMENTS OF THE INVENTION

Figure 1A:
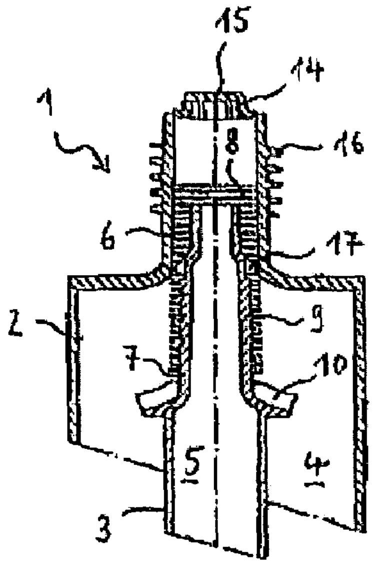
FIG. 1A, a first embodiment of a cartridge according to the invention in longitudinal section during assembly, before engagement of the necks of the inner and outer tubes, FIG. 1B, the first embodiment in the completely assembled state, FIG. 2A, a side view of the inner tube of the first embodiment, FIG. 2B, a cross section along the line A—A in FIG. 2A, FIG. 3A, a second embodiment of a cartridge according to the invention with thread-shaped locking elements, in the completely assembled state in longitudinal section, and FIG. 3B, a side view of the inner tube of the second embodiment.
Figure 1B:
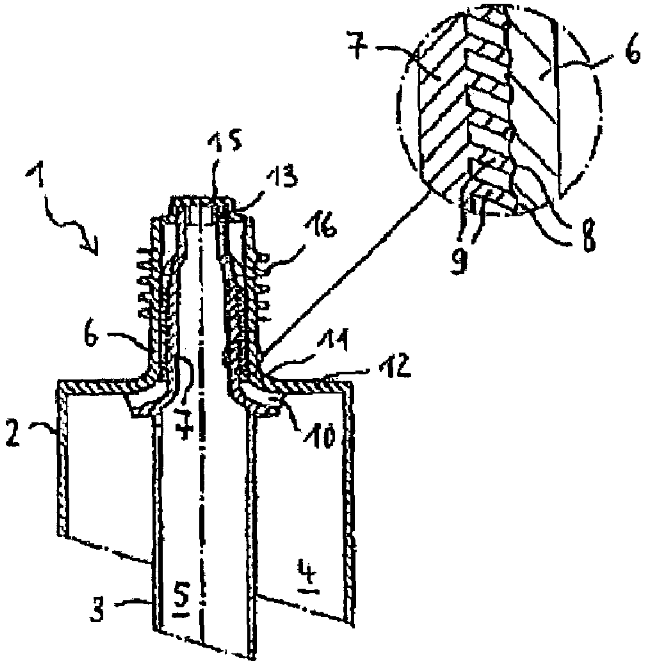

According to a first embodiment shown in FIGS. 1A and 1B, a two-component cartridge 1 according to the invention includes a cylindrical outer tube 2, and an inner tube 3 that is the same. For the use of the cartridge 1, the two tubes are arranged coaxial to each other, and in this way define an intermediate space 4, in the form of a hollow cylinder, in which is located one of the two components of an adhesive or the like for simultaneous squeezing from the cartridge 1. The interior 5 of the inner tube 3 contains the other component. The outer tube 2 and the inner tube 3 are manufactured separately and connected to each other before the cartridge 1 is filled with the two components.

FIG. 1A shows the state after the inner tube 3 has been inserted into the outer tube 2, but before realizing a mechanical connection of the two tubes 2 and 3. FIG. 1B shows the state in which the two tubes are rigidly connected to each other, and are ready for filling with the two components. Because the parts of the two tubes 2 and 3 are identical in FIGS. 1A and 1B, not all reference symbols are recorded in both figures.

The mechanical connection of the two tubes 2 and 3 is realized in the region of the necks 6 and 7 respectively, forming the outlet channels for the two components. Here, the neck 6 of the outer tube 2 features in its lower region on the inner side a plurality of similar, successive channels 8 that are equidistant in the axial direction. The depth of the channels 8 is dimensioned such that, for production by injection molding, a forced removal on the inner side of the neck 6 is still possible. Starting from the lower end of the neck 6, the grooves 8 extend over approximately more than its lower half in the axial direction. They lie in parallel planes the normal direction of which is the axial direction of the cartridge 1.

As a counterpart to the channels 8 on the inner side of the neck 6 of the outer tube 2, the neck 7 of the inner tube 3 features on its outer side a plurality of similar, successive integrated ribs 9, which are likewise equidistant in the axial direction. In this way, the axial spacing of the ribs 9 is the same as that of the channels 8. The outer diameter of the neck 7 of the inner tube 3, including the ribs 9, is greater than the clearance diameter of the channels 8. The axial length of the region of the neck 7 of the inner tube 3 over which the ribs 9 extend corresponds approximately to the axial length of the region of the neck 6 of the outer tube 23 over which the channels 8 extend, i.e., the number of ribs 9 agrees at least approximately with the number of channels 8, with this not, however, being an exact match. The number of grooves 8 and ribs 9 lies between 10 and 15, and is 13 for the example shown in FIGS. 1A and 1B.

As can be seen from FIG. 1B, the channels 8 and ribs 9 are arranged so that they engage when the inner tube 3 is pushed into contact with the outer tube 2. This contact is defined by other ribs 10, which extend from the lower end of the neck 7 of the inner tube 3, along its outer side, in the approximately radial direction. These ribs 10 are adapted in shape to the contours of the inner surface of the outer tube 2 in the region of the transition 11 from an at least approximately radial end wall 12 of the same to the neck 6. At least three, four in the example shown, ribs 10 are distributed uniformly over the periphery of the inner tube 3. Here, the height of the ribs 10 defines the height of the through-channel. The components located in the hollow-cylindrical intermediate space 4 between the outer tube 2 and the inner tube 3 flow radially through this through-channel in the direction of the necks 6 and 7 when the cartridge 1 is squeezed.

When, as shown in FIG. 1B, the ribs 10 contact the transition 11 and the approximately radial end wall 12 from the inside, the top end 13 of the neck 7 of the inner tube 3 projects into an annular groove 14 of the cover 15 of the cartridge 1, said groove being arranged on the inner side for this purpose and being connected integrally with the neck 6 of the outer tube 2. In this way, the interior 5 of the inner tube 3 is sealed relative to the hollow-cylindrical interior 4 between the two tubes 2 and 3, so that the two components located in the spaces 4 and 5 do not come into contact with each other and cannot react in the cartridge 1. The ribs 16 visible in FIGS. 1A and 1B on the outer side of the outer neck 6 represent a thread, not related to the present invention, that is used to screw on a closing cap for the purpose of reclosing a used cartridge 1, or as a static mixer for mixing the two components.

The axial thickness of the ribs 9 on the outer side of the inner tube 3 is designed in relation to their radial length so that the ribs bend far enough downward when a predetermined axial force is exerted on the inner tube 3, in the position shown in FIG. 1A, that the neck 7 of the inner tube 3 can slide into the neck 6 of the outer tube 2 until the previously explained contact position shown in FIG. 1B is reached.

For axial centering of the neck 7 of the inner tube 3 relative to the neck 6 of the outer tube 2, several, i.e., at least three, four in the example shown, tabs 17 are formed integrally on the neck 7 above the ribs 10. These tabs have a diagonal outer surface. Matching this configuration, the transition 11 of the outer tube 2 is likewise angled at its neck 6 on the inner side, so that from a non-centered position of the two tubes 2 and 3 relative to each other, when an axial force is exerted on the inner tube 3 the diagonal outer surface of the tab 17 that first contacts the outer tube 2 slides along the aforementioned angled inner side of the transition 11, and can move the inner tube 3 toward the center position.

At the top right, FIG. 1B also shows an enlarged cut-out of the region of the two necks 6 and 7 in which the outer tube 2 and the inner tube 3 are connected to each other by the effect of the ribs 9 in the final assembled state of the cartridge 1. In this figure, it is clear that due to the length of the ribs 9, which somewhat exceeds the open width of the channels 8, the ribs no longer extend outward in the radial direction after the neck 7 of the inner tube 3 is pressed into the neck 6 of the outer tube 2 but instead are somewhat inclined, and in fact are backwards in terms of the installation direction, i.e., the movement direction of the inner tube 3 during the aforementioned pressing. The slope of the ribs 9 in the final assembled state of the cartridge 1 is comparable with that of the branches of a Christmas tree, with each rib 9 being locked in a channel 8 and supported with its end in this channel, i.e., especially on its lower edge. The degree of slope depends on how much the outer diameter of the neck 7 including the ribs 9 exceeds the clearance width of the channels 8.

From the detail enlargement in FIG. 1B, it can also be seen that the surface profile of the inner side of the outer neck 6 features no sharp edges, but instead the transitions into the channels 9 as well as the channels themselves have a smooth profile. Due to the necessity of forced ejection, this is required for manufacture using injection molding.

For an axial force exerted on the inner tube 3 opposite that of its installation direction, the ribs 9 permit a large axial force component to be transferred to the lower channel sides due to their slope and therefore prevent possible unlocking, i.e., loosening of the connection.

A side view of the inner tube 3 of the cartridge 1 in the unassembled original state is shown enlarged in FIG. 2A. In this figure, the two types of ribs 9 and 10 as well as the tabs 17 are even more clearly visible than in the cross section of the two assembly phases in FIGS. 1A and 1B. In particular, FIG. 2A also shows that the ribs 9 do not extend in a ring around the entire neck of the inner tube 3, but instead form individual segments in the circumferential direction, between which rib-free segments 18 are located. The latter form, in the final assembled state of the cartridge 1, vertical channels between the two necks 6 and 7 through which the component located in the intermediate space 4 between the outer tube 2 and the inner tube 3 can flow when the cartridge 1 is squeezed. What is important is not an exactly vertical profile of these channels, but rather that some openings for the aforementioned components are provided in the vertical direction, which could also extend, e.g., in the shape of a helix.

The outer diameter of the neck 7 of the inner tube 3 including the ribs 9, as well as the inner diameter of the neck 6 of the outer tube 2 decreases slightly in the direction towards the corresponding outlet end. In the present case, this slight amount of taper, which is known for injection-molded parts in view of their ejection, means that the force necessary for pressing the inner neck 7 into the outer neck 6 increases somewhat less strongly with increasing pressing depth than would be the case for uniform outer or inner diameters. However, the outer diameter of the inner neck 7 at the height of the topmost of the ribs 9, including the same, is greater than even the inner diameter of the outer neck 6 at its lower beginning, so that already the topmost of the ribs 9 must be bent downward when it is pressed into the lowermost of the channels 8 in order to be able to be locked.

From the cross section along the line A—A in FIG. 2A shown in FIG. 2B, it can be seen that the inner tube 3 features two axes of symmetry that are perpendicular to each other, so that its neck 7 features four circumferential segments with ribs 9, four ribs 10, and four circumferential segments 18 without ribs. The neck 7 is not the shape of a hollow cylinder, but instead indented concavely inward in the region of its rib-free peripheral segments 18 in order to enlarge the cross section of the vertical outlet channels, formed there in the final assembled state of the cartridge 1 together with the neck 6 of the outer tube, for pressing material out of the cartridge 1. In this way, an essentially cross-shaped cross section of the neck 7 of the inner tube 3 is realized, which also applies to the outlet channel 20 for the component located in the interior 5 of the inner tube 3. For the embodiment illustrated, in the final assembled state approximately 35% of the cross-sectional area between the inner side of the outer neck 6 and the outer side of the inner neck 7 is covered by the ribs. However, the covered area of the cross section can also be significantly greater or smaller.

The essentially radial end wall 19 of the inner tube 3 extends like a flange in the region of the ribs 10 projecting upward away from it over the envelope surface of the inner tube 3, and thus likewise has essentially the shape of a cross. This configuration enables a correspondingly greater length of the ribs 10, which realizes a correspondingly more stable support of the inner tube 3 against the end wall 12 of the outer tube 2.

A second embodiment of the present invention is shown in FIGS. 3A and 3B, wherein FIG. 3A shows, analogously to FIG. 1B, the final assembled state of the cartridge 101, and FIG. 3B, shows analogously to FIG. 2A, a side view of the inner tube 103. The reference symbols of corresponding parts of the two embodiments are distinguished by the addition of 100 to the number.

For the second embodiment, the shape of the outer tube 102 for the most part agrees with that of the previously described first embodiment. In relation to the outer tube 102, the inner tube 103 has a greater diameter in comparison to the first embodiment, which is not important, however. The essential difference relative to the first embodiment lies in the shape of the ribs 109 on the outer side of the neck 107 of the inner tube 103 as well as in the matching shape of the channels 108 on the inner side of the neck 106 of the outer tube 102.

As can be seen from FIG. 3B, the ribs in the unassembled state of the inner tube 103 do not each extend in a plane whose normal direction is the axial direction of the cartridge 1, but instead the ribs 109 form a screw thread on the outer side of the neck 107. Correspondingly, the channels 108 in the neck 106 form a matching inner thread. For the second embodiment, when a forced removal from the mold of the channels 108 is also taken into account after the injection molding, their depth is on the same order of magnitude as that for the first embodiment. Alternatively, the channels 108 can also be demolded by spinning out, which enables a greater depth of the channels 108 as well as also an edge-shaped profile of the same.

The ribs 109 are thicker in the axial direction of the cartridge 101 than for the first embodiment and, in contrast to that embodiment, they are not arranged, so that for assembly of the cartridge 101 the ribs are brought into a deformed state that remains permanent in the final assembly state. Instead, the ribs 109 are either deformed insignificantly, which is the case when the connection between the outer tube 102 and the inner tube 103 is realized by rotating the outer thread formed by the ribs 109 in the inner thread formed by the channels 108, or the neck 107 of the inner tube 103 is pressed into the neck 106 of the outer tube 102 as in the first embodiment, with this leading to temporary elastic deformations and with the ribs snapping over several thread pitches, before they lock in each other in the final position of the two tubes 102 and 103. The last mentioned assembly method obviously assumes a relatively low depth at least in one of the two threads, wherein preferably the inner thread formed by the channels 109 is designed to be flat so that it can be removed from the mold by forcible ejection.

Otherwise, the construction of the second embodiment essentially corresponds to that of the first, so that a repeated explanation of the other construction features, such as the ribs 110 acting as axial stops and the rib-free, peripheral segments 118 of the neck 107 creating vertical outlet channels, can be eliminated.

The preceding description of the two embodiments discloses a series of modifications of the invention for someone skilled in the art. These include varying, e.g., the number of peripheral segments with ribs, their lengths in relation to the rib-free segments, as well as their arrangement in the peripheral position across the height. Similarly, the profile of the ribs and the channels in the longitudinal section, as well as the length of the neck sections provided with ribs or channels, e.g., can also be varied. Such modifications and comparable modifications that are subject to the discretion of someone skilled in the art should be included under the protection of the patent.

What is claimed is:

1. Coaxial two-component cartridge with a cylindrical outer tube and a separate cylindrical inner tube coaxially surrounded by the outer tube, whereby the outer and inner tubes define an intermediate space in the form of a hollow cylinder between each other, the cartridge separately including two components, namely one in an interior of the inner tube and the other in the intermediate space, for simultaneous squeezing from the cartridge, characterized in that both the outer and inner tubes each includes at one respective end a respective neck, wherein the neck of the inner tube has an outlet channel for a component located in the interior of the inner tube, and wherein the inner side of the neck of the outer tube and the outer side of the neck of the inner tube are each provided with locking elements that can be moved into engagement with each other, for the coaxial introduction of the inner tube into the outer tube, such that they fix the inner tube relative to the outer tube coaxially and in a predetermined axial position, in which outlet channels for a component located in the intermediate space between the two tubes are formed between the neck of the inner tube and the neck of the of the outer tube, further characterized in that the locking elements of the neck of the outer tube are formed in the axial direction by a plurality of successive channels, and the locking elements of the neck of the inner tube are formed in the axial direction by a plurality of successive ribs integral with the neck, and the outer diameter of the neck of the inner tube including the ribs is at least as large as the clearance diameter of the channels.

2. Coaxial two-component cartridge according to claim 1, characterized in that the axial spacing of the ribs matches the spacing of the channels, and engage in each other in the assembled state.

3. Coaxial two-component cartridge according to claim 1, characterized in that the number of channels is approximately as large as the number of ribs.

4. Coaxial two-component cartridge according to claim 1, characterized in that the ribs extend at least over half of the length of the neck of the inner tube.

5. Coaxial two-component cartridge according to claim 1, characterized in that the ribs extend along the periphery of the neck of the inner tube across a plurality of individual segments, between which there are peripheral segments without ribs.

6. Coaxial two-component cartridge according to claim 5, characterized in that all of the ribs are the same length in the circumferential direction relative to the diameter of the associated channels, and are arranged equidistant to each other circumferentially.

7. Coaxial two-component cartridge according to claim 1, characterized in that in the unassembled state of the inner tube the ribs extend perpendicular to its center axis and the channels lie in planes extending perpendicular to the center axis of the outer tube.

8. Coaxial two-component cartridge according to claim 1, characterized in that the outer diameter of the neck of the inner tube including the ribs, as well as the inner diameter of the neck of the outer tube, decreases in the direction towards the outlet end.

9. Coaxial two-component cartridge according to claim 1, characterized in that the outer diameter of the inner tube including the ribs is greater than the clearance diameter of the channels.

10. Coaxial two-component cartridge according to claim 1, characterized in that both the ribs and also the channels are formed as matching screw threads, by means of which the inner tube can be connected to the outer tube by screwing.

11. Coaxial two-component cartridge according to claim 1, characterized in that both tubes are manufactured from plastic in an injection-molding process.

12. Coaxial two-component cartridge according to claim 1, characterized in that the channels are generated by forced demolding or by rotating threads out from behind.

13. A-coaxial two-component cartridge comprising:

an outer tube; and a separate inner tube positioned within and coaxially surrounded by the outer tube, whereby the outer and inner tubes define an intermediate space in the form of a hollow cylinder between each other, wherein both the outer and inner tubes each includes at one respective end a respective neck, wherein the inner side of the neck of the outer tube and the outer side of the neck of the inner tube are each provided with locking elements that can be moved into engagement with each other, for the coaxial introduction of the inner tube into the outer tube, such that they fix the inner tube relative to the outer tube coaxially and in a predetermined axial position, wherein the locking elements of the neck of the outer tube are formed in the axial direction by a plurality of successive channels, and the locking elements of the neck of the inner tube are formed in the axial direction by a plurality of successive ribs integral with the neck, and the outer diameter of the neck of the inner tube including the ribs is at least as large as the clearance diameter of the channels; and wherein there is a seal or cover on the outer tube that can be cut, torn, or broken and that is integrated with the outer tube.

14. Coaxial two-component cartridge according to claim 1, further comprising a cover connected integrally with the neck of the outer tube, the cover sealing the interior of the inner tube relative to the intermediate space between the inner and outer tubes at the end of the neck of the inner tube.

15. Two-component cartridge for segregating first and second components of a mixture, comprising:

an outer cylindrical tube having at a first end thereof an outer tube neck; and an inner cylindrical tube having at a first end thereof an inner tube neck defining a second outlet channel, wherein the inner cylindrical tube is co-axially positioned in the outer cylindrical tube defining a hollow cylindrical intermediate space between the outer and inner cylindrical tubes and the inner tube neck is positioned in the outer tube neck thereby defining a first outlet channel; and a sealing mechanism including a plurality of successive channels circumferentially positioned about an inner surface of the outer tube neck and a plurality of ribs circumferentially positioned about an outer surface of the inner tube neck such that an outer diameter of the combination of the inner tube neck and the ribs is at least as large as a clearance space of the first outlet channel, wherein the inner cylindrical tube is selectably movable with respect to the outer cylindrical tube such that the sealing mechanism is moved from a closed position to an open position, wherein the hollow cylindrical intermediate space is configured and dimensioned to receive the first component of the mixture and an interior of the inner cylindrical tube is configured and dimensioned to receive the second component of the mixture; and wherein in the open position the first component can exit the hollow cylindrical intermediate space through the first outlet channel and the second component can exit the inner cylindrical tube through the second outlet channel, thereby combining the first and second components of the mixture.

16. Two-component cartridge for segregating first and second components of a mixture according to claim 15, wherein in the closed position a portion of the plurality of ribs engage the plurality of channels in the outer cylindrical tube, sealing the first outlet channel.

17. Two-component cartridge for segregating first and second components of a mixture according to claim 15, wherein the plurality of successive channels take the form of inner screw threads and the plurality of ribs take the form of outer screw threads, such that the inner tube neck can be screwed into the outer tube neck.

18. Two-component cartridge for segregating first and second components of a mixture according to claim 15, wherein the plurality of ribs comprises a first set of ribs positioned in a substantially circumferential direction about the inner tube neck and a second set of ribs positioned in a substantially longitudinal direction about the inner tube neck.

19. Two-component cartridge for segregating first and second components of a mixture according to claim 15, further comprising a cover covered integrally with the outer tube neck, the cover sealing the interior of the inner tube relative to the intermediate space between the inner and outer tubes at the end of the inner tube neck.

20. Two-component cartridge for segregating first and second components of a mixture as set forth in claim 15 wherein the inner and outer cylindrical tubes are manufactured from plastic in an injection-molding process.

* * * * *